(12) United States Patent
Jo et al.

(10) Patent No.: US 11,157,711 B2
(45) Date of Patent: Oct. 26, 2021

(54) DISPLAY DEVICE

(71) Applicant: Samsung Display Co., Ltd., Yongin-si (KR)

(72) Inventors: Jae Hyung Jo, Yongin-si (KR); Sung Hwan Kim, Yongin-si (KR); Jung Hak Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/712,875

(22) Filed: Dec. 12, 2019

(65) Prior Publication Data

US 2020/0272802 A1 Aug. 27, 2020

(30) Foreign Application Priority Data

Feb. 26, 2019 (KR) .................. 10-2019-0022478

(51) Int. Cl.
*G02B 7/02* (2021.01)
*G06K 9/00* (2006.01)

(52) U.S. Cl.
CPC ........... *G06K 9/00013* (2013.01); *G02B 7/02* (2013.01)

(58) Field of Classification Search
CPC ........... G06K 9/00046; G06K 9/00013; G06K 9/0008; G06K 9/0004; A61B 5/1172; G02F 1/13338; G02B 7/02
See application file for complete search history.

(56) References Cited

U.S. PATENT DOCUMENTS

| | | | |
|---|---|---|---|
| 8,933,894 B2 * | 1/2015 | Park | G06F 3/0412 345/173 |
| 2017/0108672 A1 * | 4/2017 | Chang | G02B 7/02 |
| 2017/0300736 A1 | 10/2017 | Song et al. | |
| 2018/0276442 A1 | 9/2018 | Kim et al. | |
| 2019/0095674 A1 * | 3/2019 | Ko | G02B 6/0053 |
| 2019/0162880 A1 * | 5/2019 | Yamamoto | G02B 13/001 |
| 2020/0311376 A1 * | 10/2020 | Kim | G06K 9/00013 |

FOREIGN PATENT DOCUMENTS

| | | |
|---|---|---|
| KR | 10-2017-0125778 | 11/2017 |
| KR | 10-2018-0107440 | 10/2018 |
| KR | 10-1947734 | 2/2019 |

* cited by examiner

*Primary Examiner* — Maurice C Smith
(74) *Attorney, Agent, or Firm* — H.C. Park & Associates, PLC

(57) ABSTRACT

A display device includes: a display panel including a display area; a fingerprint sensor disposed under the display panel overlapping the display area, the fingerprint sensor including: an optical lens; a lens frame disposed under the optical lens; an image sensor disposed under the lens frame and exposed toward the optical lens through an opening formed in the lens frame; and an adhesive layer disposed between the lens frame and the display panel and surrounding the optical lens in a plan view, and attaching the lens frame and the display panel to each other; and a lens guide disposed between the adhesive layer and the optical lens in the plan view, and configured to maintain a distance between a lower surface of the display panel and an upper surface of the optical lens, the lens guide protruding from an upper surface of the lens frame toward the display panel.

18 Claims, 13 Drawing Sheets

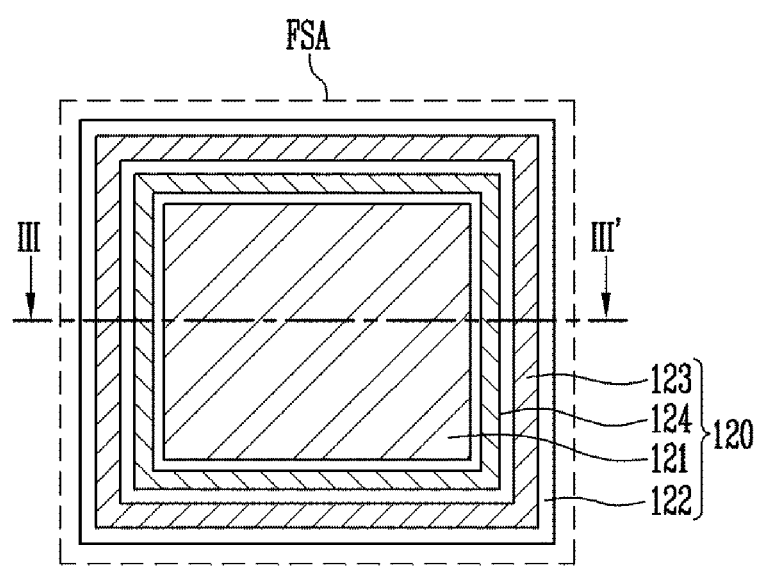

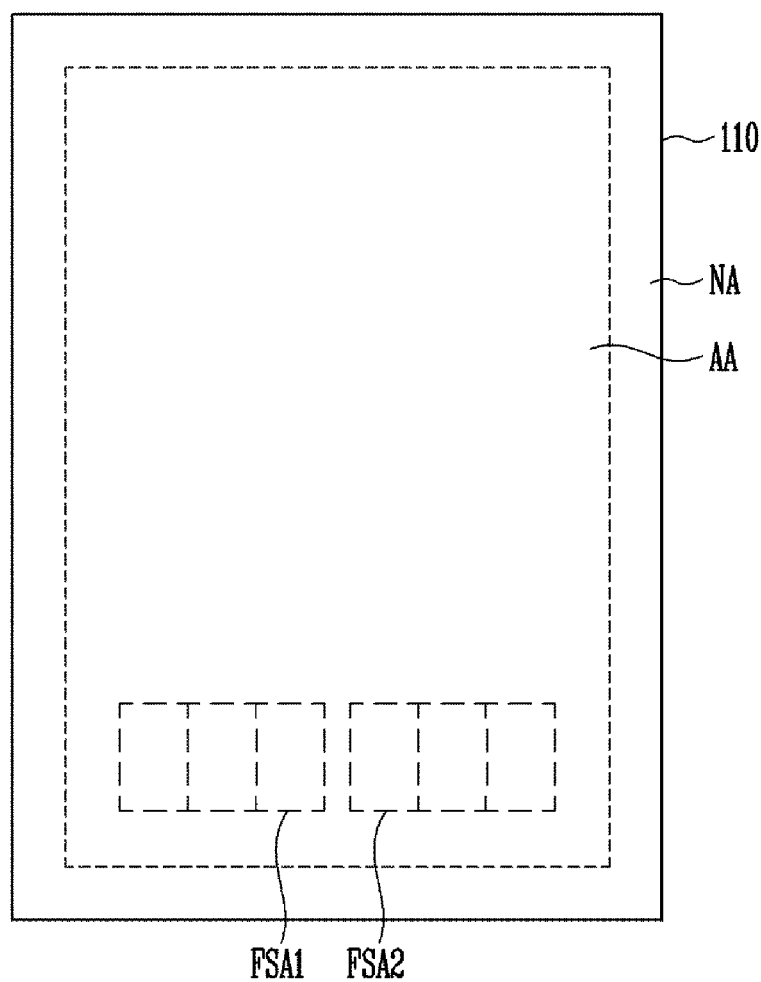

DISPLAY DEVICE

CROSS-REFERENCE TO RELATED APPLICATION

The application claims priority from and the benefit of Korean Patent Application No. 10-2019-0022478, filed on Feb. 26, 2019, which is hereby incorporated by reference for all purposes as if fully set forth herein.

BACKGROUND

Field

Exemplary embodiments relate to a display device.

Discussion of the Background

With the development of information technology, the importance of display devices, which are a connection medium between users and information, has been emphasized. In response to this, the use of display devices such as a liquid crystal display device, an organic light emitting display device, and a plasma display device has been increasing.

Some display devices may be configured to recognize fingerprints. The display devices may include a fingerprint sensor disposed in a fingerprint sensing area that a finger contacts. The fingerprint sensor may recognize a fingerprint when a finger touches an upper surface of a display panel.

The above information disclosed in this Background section is only for understanding of the background of the inventive concepts, and, therefore, it may contain information that does not constitute prior art.

SUMMARY

Devices constructed according to exemplary embodiments of the invention are capable of improving a performance of a fingerprint sensor by disposing a lens guide between an adhesive layer for attaching the fingerprint sensor to a display panel and an optical lens of the fingerprint sensor so that the optical lens and the display panel are spaced apart and an air gap between the display panel and the optical lens is maintained.

Additional features of the inventive concepts will be set forth in the description which follows, and in part will be apparent from the description, or may be learned by practice of the inventive concepts.

According to one or more exemplary embodiments of the invention, a display device includes: a display panel including a display area; a fingerprint sensor disposed under the display panel overlapping the display area, the fingerprint sensor including: an optical lens; a lens frame disposed under the optical lens; an image sensor disposed under the lens frame and exposed toward the optical lens through an opening formed in the lens frame; and an adhesive layer disposed between the lens frame and the display panel and surrounding the optical lens in a plan view, the adhesive layer attaching the lens frame and the display panel to each other; and a lens guide disposed between the adhesive layer and the optical lens in the plan view, the lens guide configured to maintain a distance between a lower surface of the display panel and an upper surface of the optical lens, the lens guide protruding from an upper surface of the lens frame toward the display panel.

An upper surface of the lens guide may be disposed at a greater distance from the upper surface of the lens frame than the upper surface of the optical lens.

A first distance between the upper surface of the optical lens and the upper surface of the lens guide may be 30% of a height of the lens guide or greater.

The first distance between the upper surface of the optical lens and the upper surface of the lens guide may be 30 μm or greater.

A thickness of the lens guide may be 20 μm or greater.

The adhesive layer may include a material compressible from 100% to 60% of an original height when plastically deformed by an external force.

An upper surface of the adhesive layer may be equal to or higher than an upper surface of the lens guide.

A second distance between the upper surface of the lens guide and the lower surface of the display panel may be ⅔ of a height of the lens guide or less.

A second distance may be 20 μm or less.

The lens guide may surround an entire side surface of the optical lens in the plan view.

The optical lens may include a plurality of vertexes in the plan view, and the lens guide may include a plurality of guides corresponding to the plurality of vertexes of the optical lens, respectively, each of the plurality of guides having an "L" shape in the plan view.

The optical lens may include a plurality of edges in the plan view, and the lens guide may include the plurality of guides corresponding to a plurality of edges of the optical lens, each of the plurality of guides extending along the plurality of edges, respectively.

The optical lens may have a shape of one of a circle, an ellipse, and a rhombus, and the lens guide may extend along a side surface of the optical lens to have a shape corresponding to the shape of the optical lens.

An upper edge of the lens guide may have a rounded shape in a sectional view.

The fingerprint sensor may include a plurality of optical lenses disposed adjacent to each other, the lens frame may be disposed under an entirety of the plurality of optical lenses, the adhesive layer may surround the plurality of optical lenses in the plan view, and the lens guide may be disposed around each of the plurality of optical lenses, and may be disposed between the entirety of the plurality of optical lenses and the adhesive layer.

The plurality of optical lenses may be arranged in a matrix form in the plan view.

The plurality of optical lenses may be arranged in a line in the plan view.

The fingerprint sensor may include a light sensor configured to recognize a fingerprint using light reflected from the fingerprint.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 2 is an enlarged plan view of a fingerprint sensing area of FIG. 1.

FIG. 8A is a plan view of a display device according to another exemplary embodiment.

DETAILED DESCRIPTION

Figure 1:
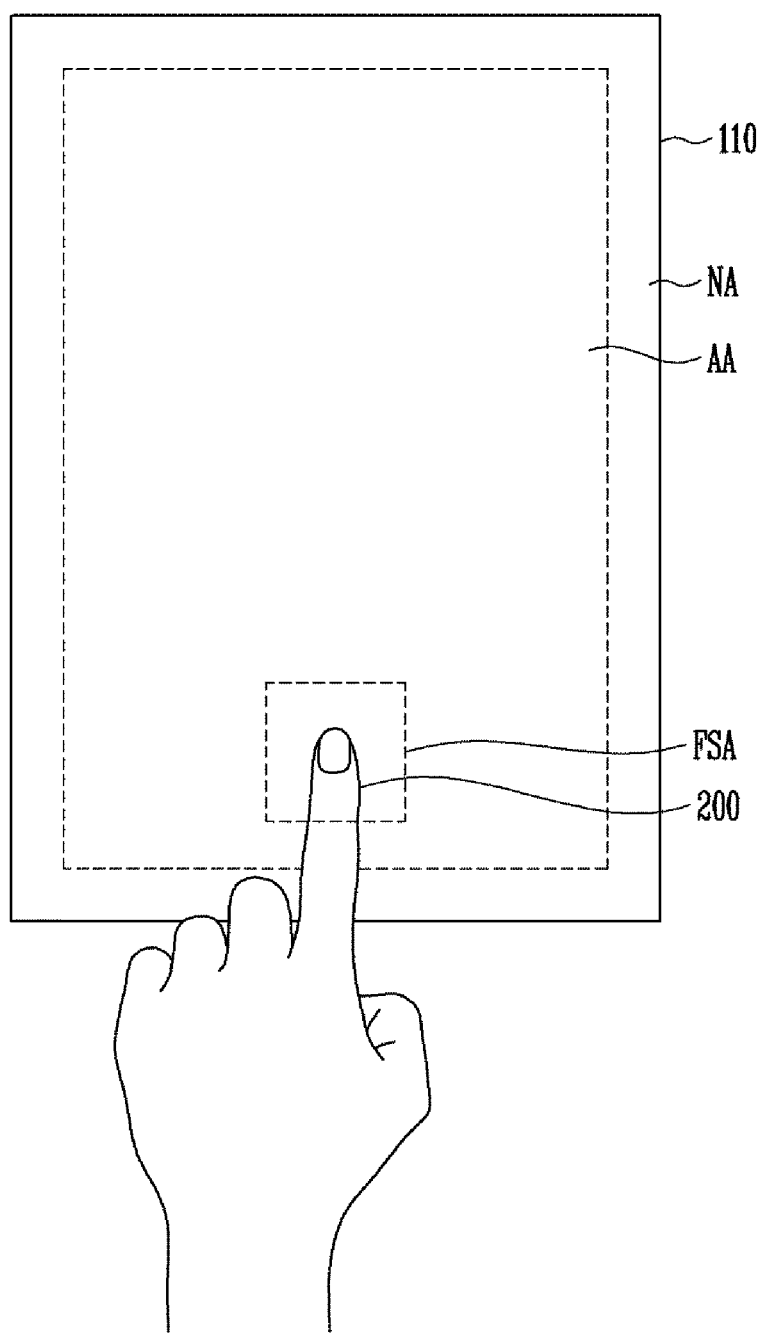
FIG. 1 is a plan view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The exemplary embodiments of the present invention will now be described in detail with reference to accompanying drawings.

Figure 3A:
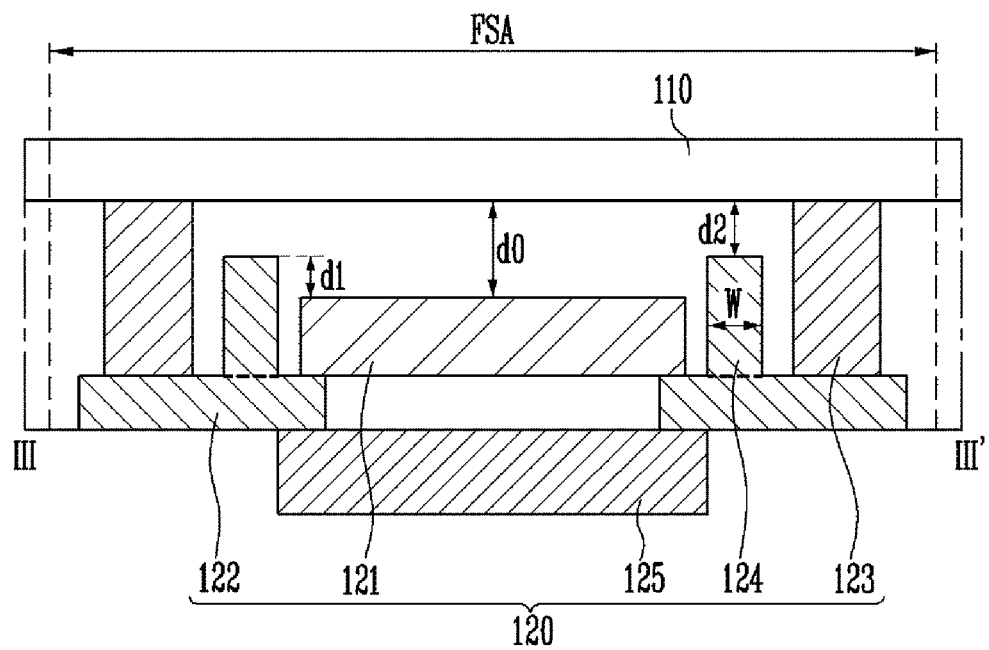
FIGS. 3A and 3B are cross-sectional views taken along a sectional line of FIG. 2.
Figure 3B:
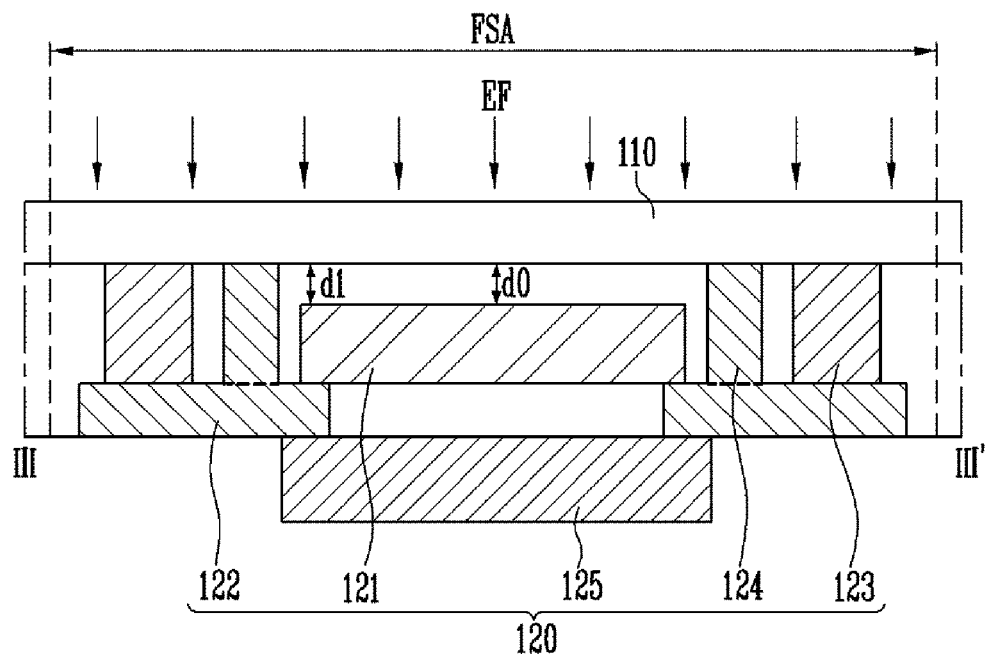

FIG. 1 is a plan view of a display device according to an exemplary embodiment. FIG. 2 is an enlarged plan view of a fingerprint sensing area of FIG. 1. FIGS. 3A and 3B are cross-sectional views taken along a sectional line of FIG. 2. For convenience of explanation, a display panel 110 and an image sensor 125 are omitted in FIG. 2.

Referring to FIGS. 1, 2, 3A, and 3B, a display device 100 may include the display panel 110 and a fingerprint sensor 120.

The display panel 110 on which an image is displayed may include a display area AA and a non-display area NA. A plurality of pixels (not shown) may be defined in the display area AA in which the image is displayed. Although the plurality of pixels are not shown in the drawings, each of the plurality of pixels may be connected to a data line, a scan line, and a light emission line corresponding thereto. The non-display area NA may be a remaining area of the display panel 110 excluding the display area AA, for example, an area surrounding the display area AA.

The display area AA may include a fingerprint sensing area FSA. The fingerprint sensing area FSA may be an area in which a fingerprint of a user of the display device 100 is recognized. The user may touch a finger 200 on an upper surface of the fingerprint sensing area FSA of the display panel 110 and a fingerprint of the finger 200 may be recognized from the fingerprint sensing area FSA by the fingerprint sensor 120 of the display device 100. The fingerprint sensing area FSA may have a square shape in a plan view, but is not limited thereto. The fingerprint sensing area FSA may have various shapes such that the fingerprint of the finger 200 can be recognized effectively.

The fingerprint sensor 120 may have a configuration for recognizing the fingerprint of the user of the display device 100. The fingerprint sensor 120 may be disposed under the display panel 110 so as to overlap the fingerprint sensing area FSA of the display panel 110. The fingerprint sensor 120 may include an optical sensor and have a fingerprint recognition function based on optics. For example, the fingerprint sensor 120 may recognize the fingerprint of the finger 200 that is in contact with the fingerprint sensing area FSA based on the light emitted from the display panel 110.

The light emitted from the display panel 110 may be reflected by the fingerprint of the finger 200 touching the upper surface of the display panel 110 and may be incident on the fingerprint sensor 120. The fingerprint sensor 120 including the optical sensor may generate an image signal corresponding to a shape of the fingerprint base on the incident light. The image signal may include information related to the fingerprint, and the fingerprint sensor 120 may provide the image signal to a control unit (not shown) of the display device 100. A manner in which the fingerprint sensor 120 recognizes the fingerprint is not limited thereto.

The fingerprint sensor 120 may include an optical lens 121, a lens frame 122, an adhesive layer 123, a lens guide 124, and an image sensor 125. The optical lens 121 of the fingerprint sensor 120 may be configured such that light reflected by the fingerprint is incident. The optical lens 121 may have a rectangular shape corresponding to a rectangular shape of the fingerprint sensing area FSA. As shown in FIG. 3A, the optical lens 121 may be located under the display panel 110 and disposed apart from the display panel 110. That is, an air gap may exist between the optical lens 121 and the display panel 110. When a distance d0 between the optical lens 121 and the display panel 110 may not be maintained at a certain distance or more, the performance of the optical lens 121 may be degraded. The optical lens 121 may be an infrared lens, but is not limited thereto. For example, the optical lens 121 may be a visible light lens.

The lens frame 122 may be a component that supports the optical lens 121. The optical lens 121 may be disposed on an upper surface of the lens frame 122 and the lens frame 122 may protect the optical lens 121 from external impact. An opening may be formed in a lower surface of the lens frame 122 to expose the image sensor 125 so that the light incident on the optical lens 121 may be incident on the image sensor 125 disposed below the optical lens 121. Light reflected from the fingerprint may be incident on an upper surface of the optical lens 121 and the light transmitted through the optical lens 121 may be incident on the upper surface of the image sensor 125 through the opening of the lens frame 122.

The adhesive layer 123 may be a component for attaching the lens frame 122 and the display panel 110. The adhesive layer 123 may surround the optical lens 121 between the lens frame 122 and the display panel 110. A lower surface of the adhesive layer 123 may be in contact with the upper surface of the lens frame 122 and an upper surface of the adhesive layer 123 may be in contact with a lower surface of the display panel 110. Thus, the lens frame 122 and the display panel 110 may be adhered to each other by the adhesive layer 123.

The lens guide 124 may be a component that separates the lower surface of the display panel 110 from the upper surface of the optical lens 121. For example, the lens guide 124 may separate the lower surface of the display panel 110 from the upper surface of the optical lens 121 by maintaining a distance between the lower surface of the display panel 110 from the upper surface of the optical lens 121. The lens guide 124 may have a rectangular shape corresponding to the rectangular shape of the optical lens 121 and may have the same shape as a wall surrounding the optical lens 121. The lens guide 124 may protrude from the upper surface of the lens frame 122 toward the display panel 110.

The image sensor 125 may be a component that senses an image of the fingerprint using the light transmitted through the optical lens 121. The light transmitted through the optical lens 121 may be incident on the image sensor 125 through the opening of the lens frame 122. The image sensor 125 may detect a shape of the fingerprint using the incident light.

However, contrary to FIGS. 3A and 3B, the image sensor 125 may not be disposed under the lens frame 122. For example, the image sensor 125 may be disposed on the lens frame 122 and supported by the lens frame 122, and the optical lens 121 may be disposed on the image sensor 125. The present invention is not limited thereto.

The adhesive layer 123 may be made of a material which is compressed by an external force to a lower level than the original height and is plastically deformed. A distance between the lower surface of the display panel 110 and the lens guide 124 may vary depending on a degree of which the adhesive layer 123 is compressed by the external force and plastically deformed. Specifically, a manufacturing process of the display device 100 may include a step of attaching the display panel 110 and the fingerprint sensor 120 to each other. The fingerprint sensor 120 on which the adhesive layer 123 is disposed may move down the display panel 110 and the fingerprint sensor 120 may be adhered to the display panel 110 by an external force applied to the display panel 110 and the fingerprint sensor 120.

A height of the lens guide 124 may be set to 60% or more of the original height before the adhesive layer 123 is compressed. The upper surface of the adhesive layer 123 may be higher than or equal to an upper surface of the lens guide 124. A second distance d2 between the upper surface of the lens guide 124 and the lower surface of the display panel 110 may be ⅔ or less of the height of the lens guide 124. For example, the second distance d2 may be 20 μm or less. However, the present invention is not limited thereto.

The adhesive layer 123 may be compressed by an external force EF, as shown in FIG. 3B. The adhesive layer 123 may be compressed to a height of 40% or less from the original height before being compressed and plastically deformed. For example, when the adhesive layer 123 is compressed to a maximum degree, i.e., 40% of the original height and plastically deformed, the height of the adhesive layer 123 may be 60% of the original height. The height of the lens guide 124 is set to 60% of the original height of the adhesive layer 123 before the lens guide 124 is compressed so that the upper surface of the adhesive layer 123 and the upper surface of the lens guide 124 may be arranged on a same plane. The upper surface of the adhesive layer 123 and the upper surface of the lens guide 124 may be in contact with the lower surface of the display panel 110.

When the adhesive layer 123 is compressed to more than 60% of the original height, the upper surface of the adhesive layer 123 may be higher than the upper surface of the lens guide 124 as shown in FIG. 3A. The upper surface of the adhesive layer 123 is in contact with the lower surface of the display panel 110 while the upper surface of the lens guide 124 may be spaced apart from the lower surface of the display panel 110.

As described above, the height of the lens guide 124 is set to 60% of the original height of the adhesive layer 123 before the lens guide 124 is compressed, so that the second distance d2 between the lens guide 124 and the display panel 110 in the display device 100 in which the manufacturing process is completed may be ⅔ of the height of the lens guide 124 when the adhesive layer 123 is not compressed, and the second distance d2 may be zero when the adhesive layer 123 is compressed to the maximum degree. That is, the second distance d2 between the lens guide 124 and the display panel 110 in the display device 100 may be ⅔ or less of the height of the lens guide 124.

The second distance d2 between the lens guide 124 and the display panel 110 is maintained at ⅔ or less of the height of the lens guide 124, so that the upper surface of the lens guide 124 may not apply significant pressure onto the lower surface of the display panel 110 and the display panel 110 may not be damaged by the upper surface of the lens guide 124 even if the adhesive layer 123 is compressed to the maximum degree by the external force in the manufacturing process of the display device 100.

The upper surface of the lens guide 124 may be higher than the upper surface of the optical lens 121. The lower surface of the lens guide 124 and the lower surface of the optical lens 121 may be on the same plane and the height of the lens guide 124 may be greater than the height of the optical lens 121. Thus, a distance between the upper surface of the lens guide 124 and the upper surface of the optical lens 121 may be separated by a first distance d1. Thus, the first distance d1 may be 30% or more of the height of the lens guide 124. More specifically, the height of the lens guide 124 may be set to be greater than a height when a ratio of the height of the lens guide 124 to the height of the optical lens 121 is 10:7. Therefore, the first distance d1 may be 30% or more of the height of the lens guide 124 and the distance between the upper surface of the optical lens 121 and the upper surface of the lens guide 124 may be secured by the first distance d1. For example, the first distance d1 may be 30 μm or more. However, the present invention is not limited thereto.

As described above, the second distance d2 may vary depending on a degree of compression and plastic deformation of the adhesive layer 123 due to the external force in the manufacturing process of the display device 100. Specifically, the second distance d2 may be set to ⅔ or more of the height of the lens guide 124. The first distance d1 may be 30% or more of the height of the lens guide 124. Therefore, the distance d0 between the optical lens 121 and the display panel 110 may correspond to a sum of the first distance d1 and the second distance d2.

A thickness w of the lens guide 124 may be 20 μm or more. When the thickness w of the lens guide 124 is less than 20 μm, the lens guide 124 may not be able to divide and support the adhesive layer 123 and the optical lens 121, and may collapse. The lens guide 124 may be formed to have the thickness w of 20 μm or more so as to divide the adhesive layer 123 and the optical lens 121 more stably and to support them.

The conventional display device does not include a lens guide disposed between an adhesive layer and an optical lens. In this case, since the adhesive layer may be compressed by an external force during a manufacturing process of the display device and the degree of compression of the adhesive layer may be varied, a separation distance between the optical lens and a display panel may not be maintained at a certain distance or more. When a fingerprint sensor includes an optical lens, if an air gap between the optical lens and the display device is not maintained at a certain distance or more, the performance of the optical lens may deteriorate. Therefore, in the conventional display device, the distance between the optical lens and the display panel may not be maintained at a certain distance or more as the adhesive layer is compressed and plastically deformed, and the performance of the optical lens is deteriorated, so that the fingerprint sensor may not correctly recognize the fingerprint.

However, in the display device 100 according to the exemplary embodiment, the distance d0 between the optical lens 121 and the display panel 110 may be maintained at a distance corresponding to the sum of the first distance d1 and the second distance d2. The lens guide 124 may be disposed between the optical lens 121 and the adhesive layer 123. The upper surface of the lens guide 124 may be higher than the upper surface of the optical lens 121 and lower or equal to the upper surface of the adhesive layer 123. The first distance d1 between the upper surface of the optical lens 121 and the upper surface of the lens guide 124 may be 30% or more of the height of the lens guide 124, and the second distance d2 between the upper surface of the lens guide 124 and the upper surface of the adhesive layer 123 may be ⅔ or less of the height of the lens guide 124. Therefore, the distance d0 between the optical lens 121 and the display panel 110 may be maintained at the distance corresponding to the sum of the first distance d1 and the second distance d2. Thus, the air gap between the optical lens 121 and the display panel 110 may be maintained at a certain distance or more, and the performance of the optical lens 121 may be improved. Therefore, the fingerprint sensor 120 may more effectively recognize the fingerprint.

In addition, according to the exemplary embodiment, the display device 100 may include the lens guide 124 so that the adhesive layer 123 may not intrude into an area where the optical lens 121 is disposed. Specifically, as viewed from the lens guide 124, a space in which the optical lens 121 is disposed may be separated from a space in which the adhesive layer 123 is disposed. Therefore, when the adhesive layer 123 is disposed on the lens frame 122 in the manufacturing process of the display device 100, the adhesive layer 123 may not be misplaced so as to overlap with the optical lens 121. In addition, the lens guide 124 may prevent or suppress the adhesive layer 123, which is spread by a pressure, from being introduced to an area where the optical lens 121 is disposed in a process of attaching the fingerprint sensor 120 and the display panel 110. Accordingly, all the light reflected from the fingerprint may be incident on the optical lens 121, and the fingerprint sensor 120 may effectively recognize the fingerprint.

Figure 4:
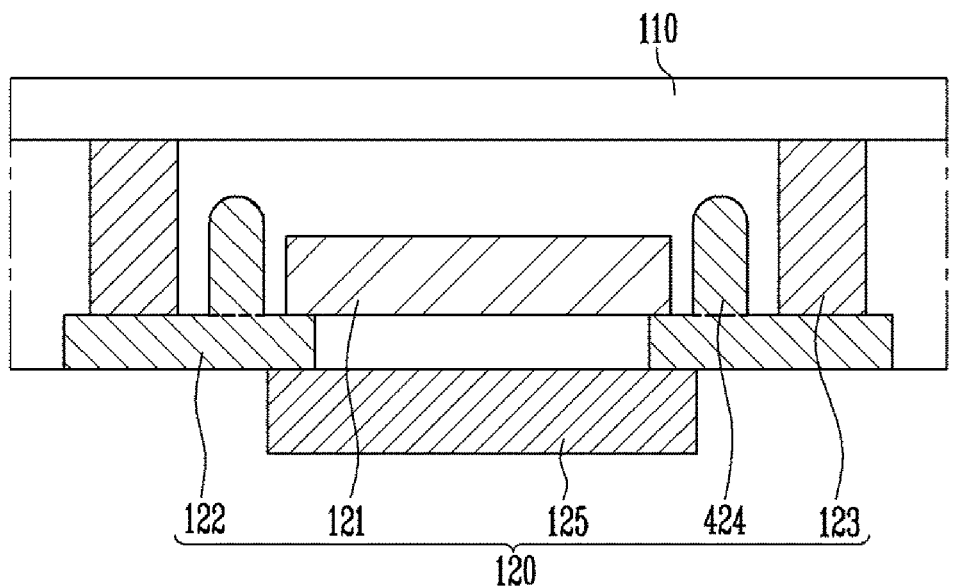
FIG. 4 is a cross-sectional view of a fingerprint sensing area of a display device according to another exemplary embodiment.

FIG. 4 is a cross-sectional view of a fingerprint sensing area of a display device according to another exemplary embodiment. A display device 400 of FIG. 4 is substantially the same as the display device 100 of FIGS. 1, 2, 3A, and 3B except for a lens guide 424, and thus duplicate descriptions are omitted.

Referring to FIG. 4, an upper surface of the lens guide 424 may have a round shape in the sectional view. Specifically, an upper edge of the lens guide 424 may have a round shape, not an angled shape, and may have a shape of a part of a spherical shape. In this case, as described above, even when the display panel 110 and the lens guide 424 are in contact with each other, there is no angular corner, and the rounded corner may be in contact with the display panel 110. Thus, the damage of the display panel 110 may be reduced.

Figure 5A:
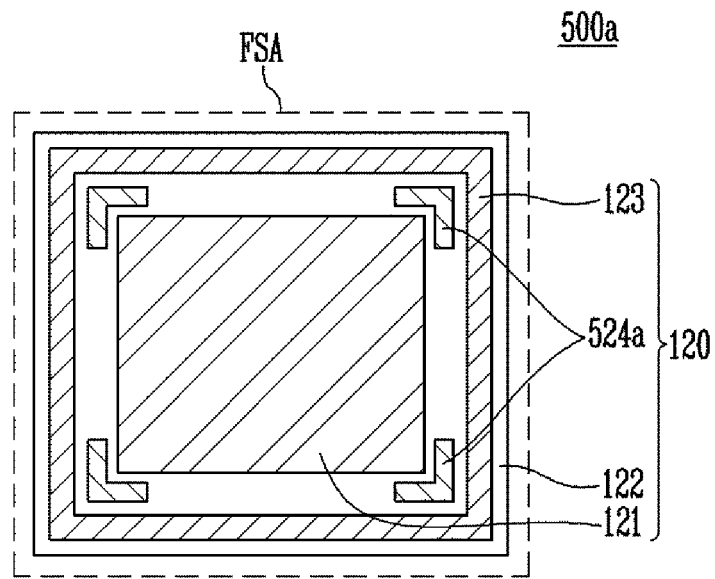
FIGS. 5A and 5B are enlarged plan views of a fingerprint sensing area of a display device according to another exemplary embodiment.
Figure 5B:
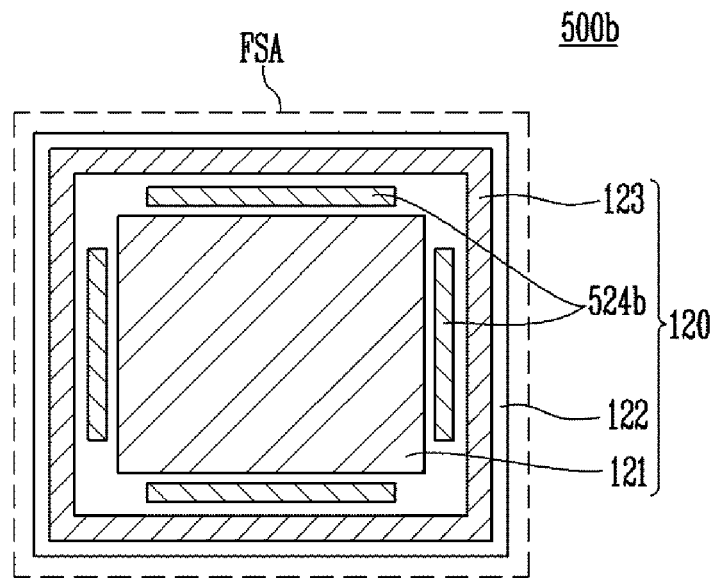

FIGS. 5A and 5B are enlarged plan views of a fingerprint sensing area of a display device according to another exemplary embodiment. Display devices 500a and 500b of FIGS. 5A and 5B are substantially the same as the display device 100 of FIGS. 1, 2, 3A, and 3B except for shapes of lens guides 524a and 524b in a plan view, and thus duplicate descriptions are omitted.

Referring to FIG. 5A, the lens guides 524a may be disposed so as to correspond to the plurality of vertexes of the optical lens 121, respectively. Specifically, the optical lens 121 may have a rectangular shape in a plan view and may include four vertexes. The lens guide 524a may include four lens guides 524a corresponding to the four vertexes of the optical lens 121. At this time, each of the lens guides 524a may be formed in an "L" shape adjacent to the vertex of the optical lens 121. Accordingly, the lens guides 524a having the "L" shape may be arranged to correspond to a part of two edges forming a vertex. The number of lens guides 524a is not limited thereto. When the optical lens 121 is a polygon such as a pentagon or a hexagon rather than a square, the number of lens guides 524a may correspond to a plurality of vertexes of the polygon.

Referring to FIG. 5B, the lens guides 524b may be disposed so as to correspond to a plurality of corners of the optical lens 121, respectively. Specifically, the optical lens 121 may have a rectangular shape in a plan view and may include four corners. The lens guide 524b may include four lens guides 524b corresponding to the four edges of the optical lens 121. At this time, each of the lens guides 524b may be adjacent to each of the edges of the optical lens 121, and may have a straight line extending along each of the edges. The number of lens guides 524b is not limited to thereto. When the optical lens 121 is a polygon such as a pentagon or a hexagon rather than a square, the number of lens guides 524b may correspond to a plurality of edges of the polygon.

Figure 6A:
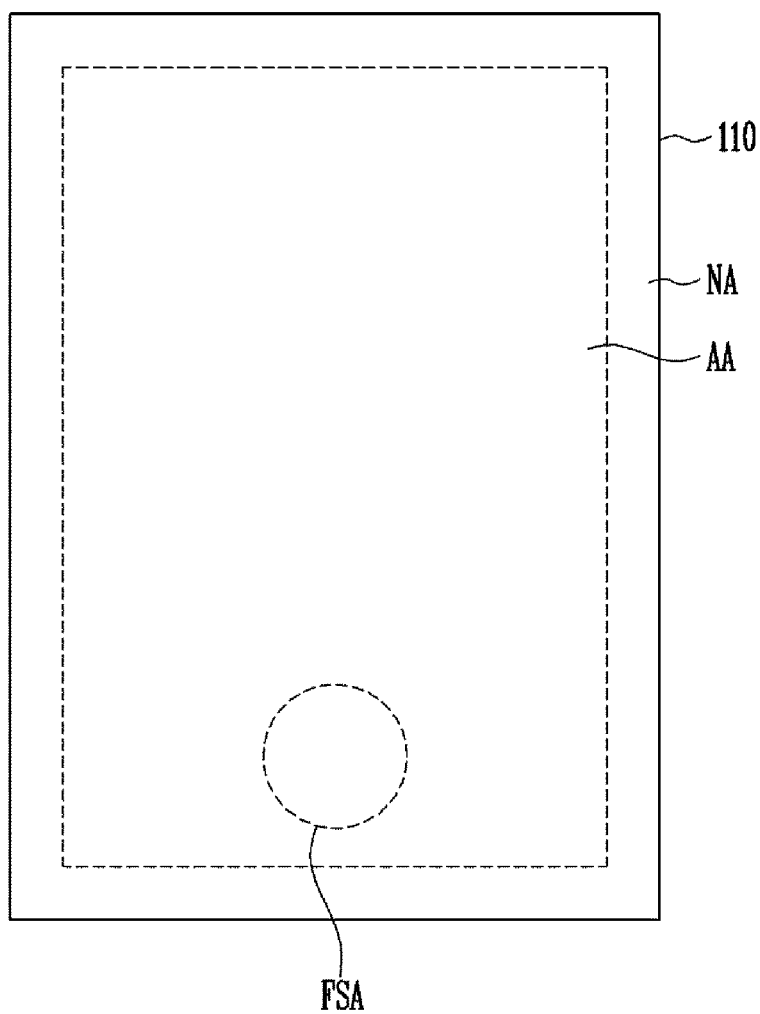
FIGS. 6A, 6B, and 6C are plan views of a display device according to another exemplary embodiment.
Figure 6B:
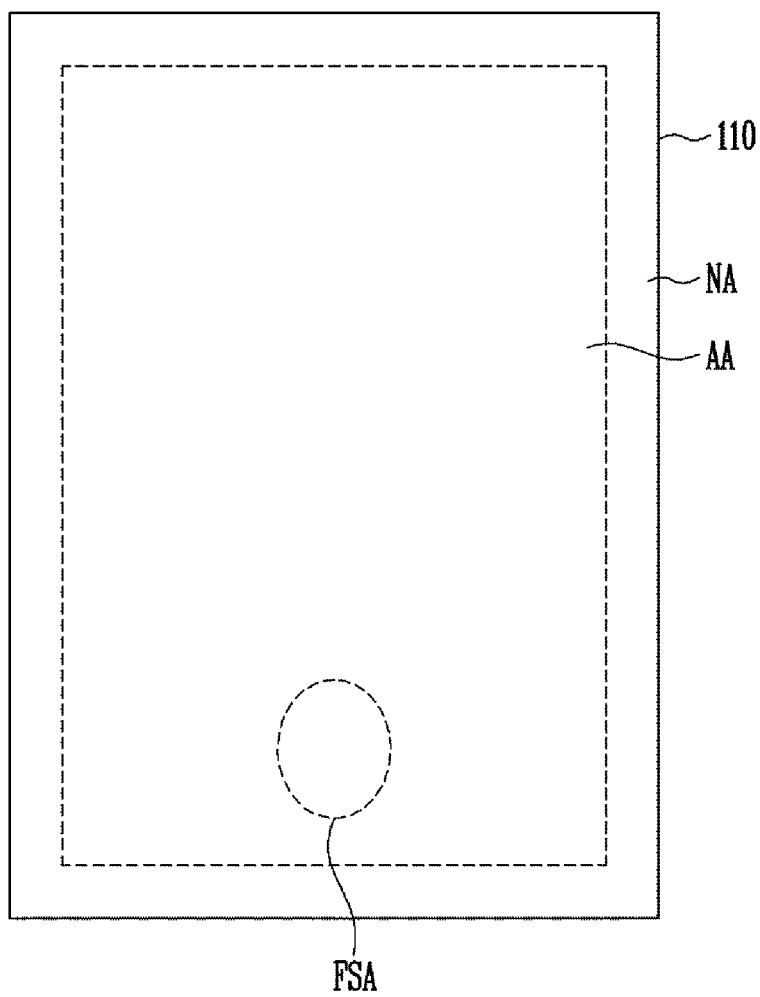
Figure 6C:
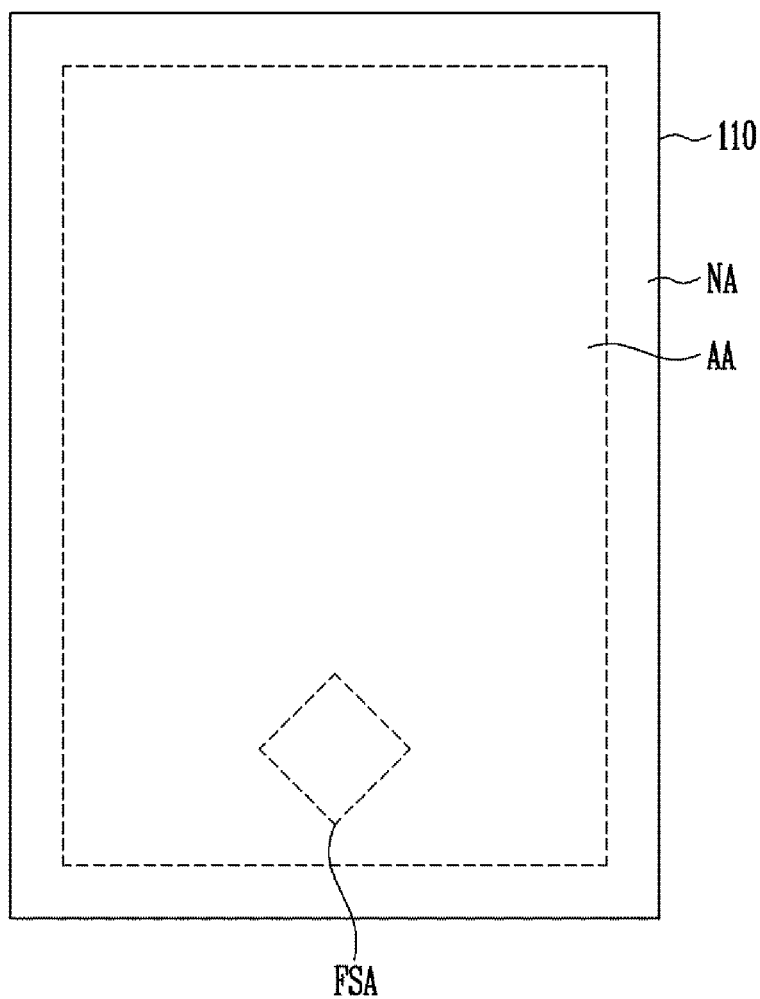

FIGS. 6A, 6B, and 6C are plan views of a display device according to another exemplary embodiment. A display device 600 of FIGS. 6A, 6B, and 6C is substantially the same as the display device 100 of FIGS. 1, 2, 3A, and 3B except that a shape of the fingerprint sensing area FSA, and thus duplicate descriptions are omitted.

Referring to FIGS. 6A, 6B, and 6C, the shape of the fingerprint sensing area FSA may be variously changed from the rectangular shape of FIGS. 1, 2, 3A, and 3B. For example, the fingerprint sensing area FSA may be circular as shown in FIG. 6A, and the fingerprint sensing area FSA may be elliptical in consideration of the shape of the finger 200, as shown in FIG. 6B. The fingerprint sensing area FSA may be rhombic as shown in FIG. 6C. The present invention is not limited thereto. The shape of the fingerprint sensing area FSA may be variously changed as needed.

In the display device 600 according to another exemplary embodiment, the shape of the fingerprint sensing area FSA may be one of a circle, an ellipse, and a rhombus shape, and may be variously changed as needed.

Figure 7A:
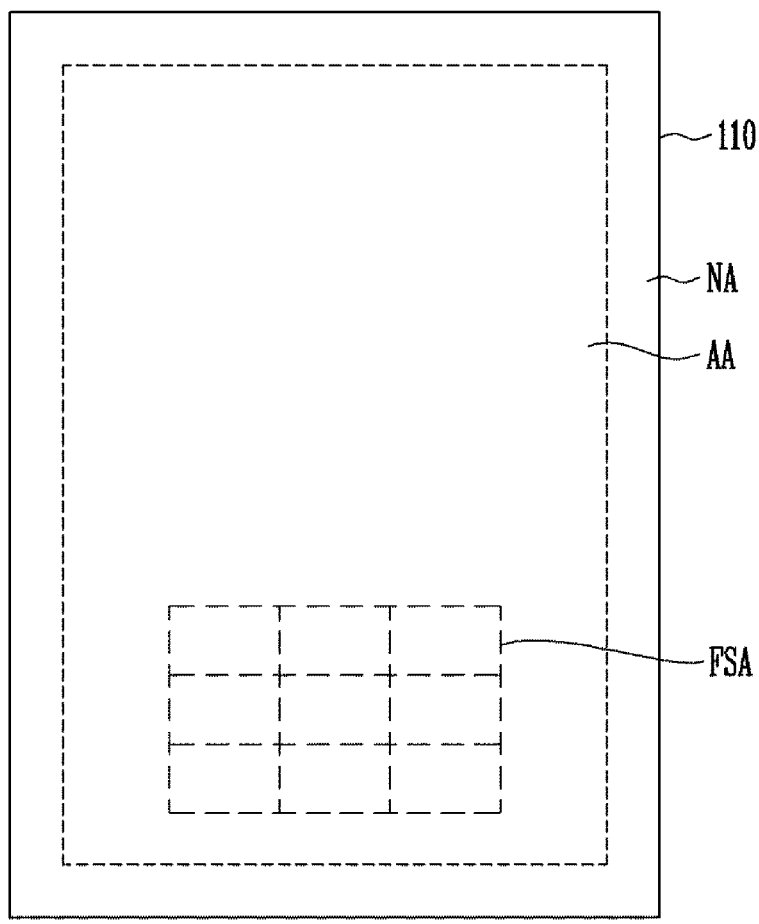
FIG. 7A is a plan view of a display device according to another exemplary embodiment.
Figure 7B:
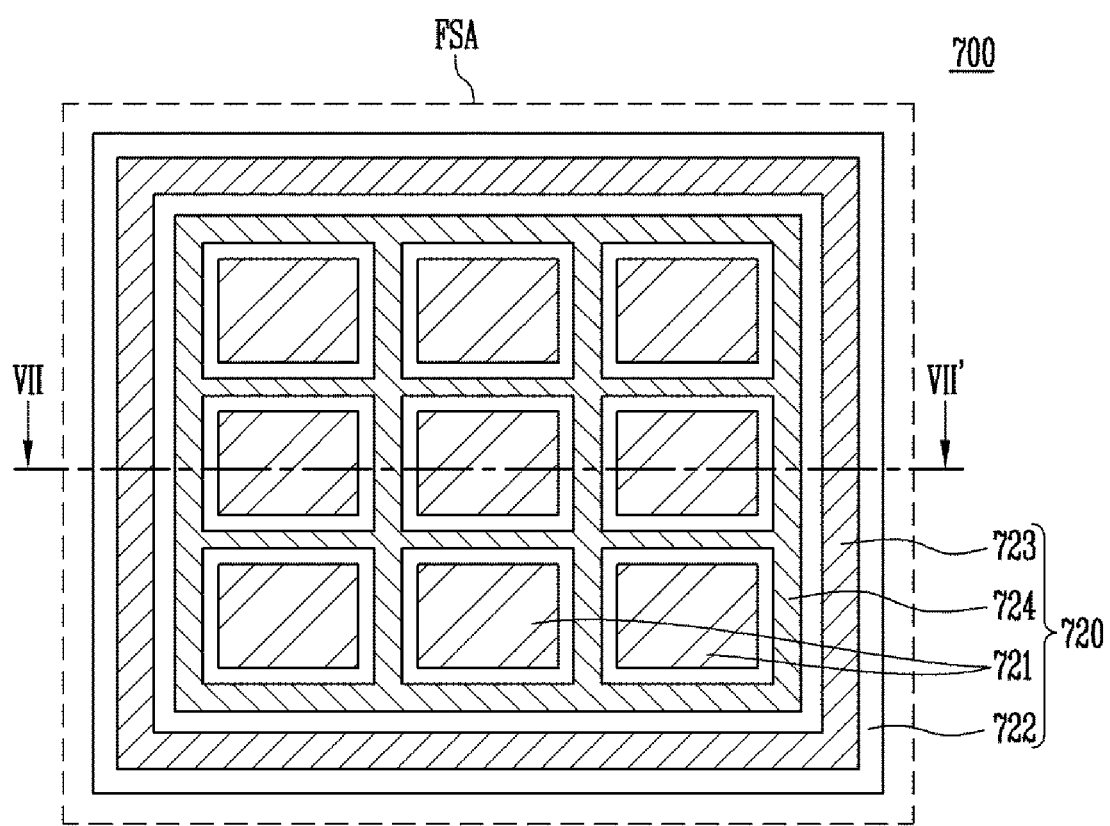
FIG. 7B is an enlarged plan view of a fingerprint sensing area of FIG. 7A.
Figure 7C:
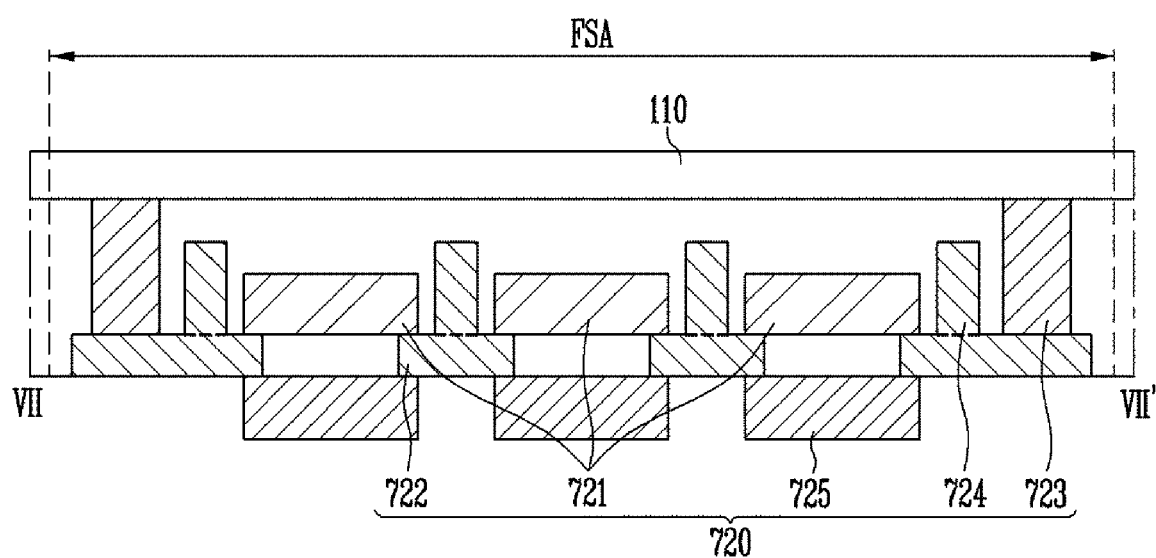
FIG. 7C is a cross-sectional view taken along a sectional line VII-VII' of FIG. 7B.

FIG. 7A is a plan view of a display device according to another exemplary embodiment. FIG. 7B is an enlarged plan view of a fingerprint sensing area of FIG. 7A. FIG. 7C is a cross-sectional view taken along a sectional line VII-VII' of FIG. 7B. A display device 700 of FIGS. 7A, 7B, and 7C is substantially the same as the display device 100 of FIGS. 1, 2, 3A, and 3B except that a fingerprint sensor 720, and thus duplicate descriptions are omitted.

Referring to FIGS. 7A, 7B, and 7C, a plurality of optical lenses 721 may be disposed in the fingerprint sensing area FSA. The plurality of optical lenses 721 may be arranged in a matrix form. For example, as shown in FIG. 7B, the number of optical lenses 721 may be nine, and may be arranged in a matrix of three rows and three columns. The number of optical lenses 721 and the number of rows and columns of the matrix are not limited thereto.

The optical lens 721 may be disposed on the lens frame 722 and openings may be formed on a lower surface of the lens frame 722 so as to correspond to the optical lenses 721. Image sensors 725 disposed under the lens frame 722 may be exposed by the openings. The image sensors 725 may be arranged to correspond to the optical lenses 721, respectively. Light reflected from the fingerprint may be incident on the upper surface of the optical lenses 721 and light transmitted through the optical lenses 721 may be incident to the upper surfaces of each of the image sensors 725 through the openings of the lens frame 722. The image sensors 725 may recognize the fingerprint using an incident light.

A lens guide 724 may be disposed at a circumference of each of the plurality of optical lenses 721 so as to correspond to each of the plurality of optical lenses 721. The lens guide 724 may be disposed between the optical lenses 721, and may be disposed to surround the entire optical lenses 721. The lens guide 724 may include nine spaces in the form of a matrix in which nine optical lenses 721 are arranged. As described in FIGS. 1, 2, 3A, and 3B, an upper surface of the lens guide 724 may be higher than an upper surface of the optical lens 721 and a distance between the upper surface of the lens guide 724 and the upper surface of the optical lens 721 may be 30% or more of the height of the lens guide 724. For example, the distance between the upper surface of the optical lens 721 and the upper surface of the lens guide 724 may be 30 µm or more. However, the present invention is not limited thereto.

An adhesive layer 723 may surround the plurality of optical lenses 721 as a whole, and may attach the lens frame 722 and the display panel 110. The adhesive layer 723 may be disposed along a circumference of the lens guide 724 and outside the lens guide 724 including the nine spaces in the form of a matrix. As described in FIGS. 1, 2, 3A, and 3B, an upper surface of the adhesive layer 723 may be higher than or equal to the upper surface of the lens guide 724. A distance between the upper surface of the lens guide 724 and the lower surface of the display panel 110 may be ⅔ or less of the height of the lens guide 724 and may be, for example, 20 µm or less. However, the present invention is not limited thereto.

In the display device 700 according to another exemplary embodiment, the display device 700 may include the plurality of optical lenses 721. The plurality of optical lenses 721 may recognize fingerprints of multiple fingers, respectively. When a plurality of fingers are brought into contact with the upper surface of the display panel 110, each fingerprint of the plurality of fingers may be simultaneously recognized. In addition, a performance of the optical lens 721 may be improved as the distance between the optical lens 721 and the display panel 110 is maintained at a specific distance or more. Thus, the fingerprint sensor 720 may more effectively recognize a plurality of fingerprints simultaneously.

Figure 8B:
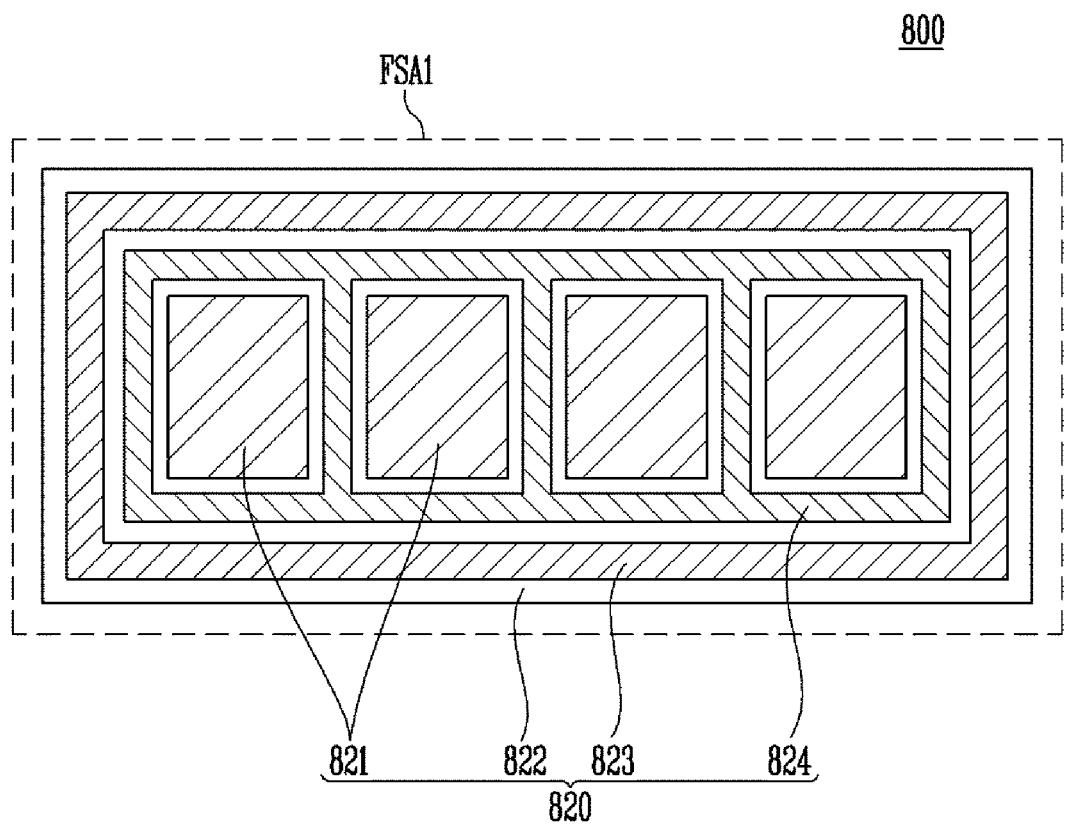
FIG. 8B is an enlarged plan view of a fingerprint sensing area of FIG. 8A.

FIG. 8A is a plan view of a display device according to another exemplary embodiment. FIG. 8B is an enlarged plan view of a fingerprint sensing area of FIG. 8A.

A display device 800 of FIGS. 8A and 8B is substantially the same as the display device 100 of FIGS. 1, 2, 3A, and 3B except that a fingerprint sensor 820, and thus duplicate descriptions are omitted.

Referring to FIGS. 8A and 8B, a plurality of optical lenses 821 may be arranged in the fingerprint sensing area FSA. The plurality of optical lenses 821 may be arranged in a line. For example, the number of optical lenses 821 may be eight and four optical lenses 821 may be arranged in a line in a first fingerprint sensing area FSA1 among the fingerprint sensing areas FSA. The four optical lenses 821 may be arranged in a line in a second fingerprint sensing area FSA2. Thus, each group of the four optical lenses 821, among the total of eight optical lenses 821, may be adjacent to each other, and all eight optical lenses 821 may be arranged in a line. The number of optical lenses 821 is not limited thereto.

FIG. 8B is an enlarged plan view of the first fingerprint sensing area FSA1. Specifically, a lens guide 824 may be disposed to correspond to a circumference of each of the four optical lenses 821. The lens guide 824 may be disposed between the optical lenses 821 and may be disposed to surround the optical lenses 821 as a whole. Thus, the lens guide 824 may include four spaces in a line in which four optical lenses 821 are arranged. As described in FIGS. 1, 2, 3A, and 3B, an upper surface of the lens guide 824 may be higher than an upper surface of the optical lens 821 and a distance between the upper surface of the lens guide 824 and the upper surface of the optical lens 821 may be 30% or more of the height of the lens guide 824. For example, a distance between the upper surface of the optical lens 821 and the upper surface of the lens guide 824 may be 30 µm or more. However, the present invention is not limited thereto.

An adhesive layer 823 may surround the four optical lenses 821, and may attach the lens frame 822 and the display panel 110. The adhesive layer 823 may be disposed along a circumference of the lens guide 824 and outside the lens guide 824 including the four spaces arranged in a line. As described in FIGS. 1, 2, 3A, and 3B, an upper surface of the adhesive layer 823 may be higher than or equal to an upper surface of the lens guide 824. A distance between the upper surface of the lens guide 824 and the lower surface of the display panel 110 may be ⅔ or less of the height of the lens guide 824 and may be, for example, 20 µm or less. However, the present invention is not limited thereto.

The fingerprint sensor 820 disposed in the second fingerprint sensing area FSA2 may have the same configuration as the fingerprint sensor 820 disposed in the first fingerprint sensing area FSA1.

In the display device 800 according to another exemplary embodiment, the display device 800 may include the plurality of optical lenses 821. The plurality of optical lenses 821 may recognize fingerprints of multiple fingers, respectively. For example, a user of the display device 800 may use four fingers of a left hand except for a thumb to contact the four optical lenses 821 of the first fingerprint sensing area FSA1. In addition, the user may use four fingers of a right hand except for a thumb to contact the four optical lenses 821 of the second fingerprint sensing area FSA2. Thus, the eight fingers of both hands may be recognized by the fingerprint sensor 820 at the same time. In addition, a performance of the optical lens 821 may be improved as the distance between the optical lens 821 and the display panel 110 is maintained at a specific distance or more. Thus, the fingerprint sensor 820 may more effectively recognize a plurality of fingerprints simultaneously.

The display device according to the exemplary embodiments of the present invention may improve the performance of the fingerprint sensor.

The foregoing description is intended to illustrate and describe the present invention. In addition, the foregoing is merely illustrative and the exemplary embodiments of the present invention, and as described above, the present invention may be used in various other combinations, modifications, and environments. Changes or modifications may be made within the scope of the inventive concepts disclosed herein, within the scope of equivalents to those described and/or within the skill or knowledge of those skilled in the art. Accordingly, the foregoing description of the invention is not intended to limit the invention to the exemplary embodiments disclosed. In addition, the appended claims should be construed to include other embodiments.

Although certain exemplary embodiments and implementations have been described herein, other embodiments and modifications will be apparent from this description.

Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel comprising a display area;
a fingerprint sensor disposed under the display panel overlapping the display area, the fingerprint sensor comprising:
an optical lens;
a lens frame disposed under the optical lens;
an image sensor disposed under the lens frame and exposed toward the optical lens through an opening formed in the lens frame; and
an adhesive layer disposed between the lens frame and the display panel and surrounding the optical lens, the adhesive layer attaching the lens frame and the display panel to each other; and
a lens guide disposed between the adhesive layer and the optical lens, the lens guide configured to maintain a distance between a lower surface of the display panel and an upper surface of the optical lens, the lens guide protruding from an upper surface of the lens frame toward the display panel.

2. The display device of claim 1, wherein an upper surface of the lens guide is disposed at a greater distance from the upper surface of the lens frame than the upper surface of the optical lens.

3. The display device of claim 2, wherein a first distance between the upper surface of the optical lens and the upper surface of the lens guide is 30% of a height of the lens guide or greater.

4. The display device of claim 3, wherein the first distance is 30 μm or greater.

5. The display device of claim 1, wherein a thickness of the lens guide is 20 μm or greater.

6. The display device of claim 1, wherein the adhesive layer comprises a material compressed from 100% to 60% of an original height when plastically deformed by an external force.

7. The display device of claim 1, wherein an upper surface of the adhesive layer is equal to or higher than an upper surface of the lens guide.

8. The display device of claim 7, wherein a second distance between the upper surface of the lens guide and the lower surface of the display panel is ⅔ of a height of the lens guide or less.

9. The display device of claim 8, wherein the second distance is 20 μm or less.

10. The display device of claim 1, wherein the lens guide surrounds an entire side surface of the optical lens.

11. The display device of claim 1, wherein the optical lens comprises a plurality of vertexes, and
wherein the lens guide comprises a plurality of guides corresponding to the plurality of vertexes of the optical lens, respectively, each of the plurality of guides having an "L" shape.

12. The display device of claim 1, wherein the optical lens comprises a plurality of edges, and
wherein the lens guide comprises a plurality of guides corresponding to the plurality of edges of the optical lens, each of the plurality of guides extending along the plurality of edges, respectively.

13. The display device of claim 1, wherein the optical lens has a shape of one of a circle, an ellipse, and a rhombus, and
wherein the lens guide extends along a side surface of the optical lens to have a shape corresponding to the shape of the optical lens.

14. The display device of claim 1, wherein an upper edge of the lens guide has a round shape in a sectional view.

15. The display device of claim 1, wherein the fingerprint sensor comprises a plurality of optical lenses disposed adjacent to each other,
wherein the lens frame is disposed under an entirety of the plurality of optical lenses,
wherein the adhesive layer surrounds the plurality of optical lenses, and
wherein the lens guide is disposed around each of the plurality of optical lenses, and is disposed between the entirety of the plurality of optical lenses and the adhesive layer.

16. The display device of claim 15, wherein the plurality of optical lenses are arranged in a matrix form.

17. The display device of claim 15, wherein the plurality of optical lenses are arranged in a line.

18. The display device of claim 1, wherein the fingerprint sensor comprises a light sensor configured to recognize a fingerprint using light reflected from the fingerprint.

* * * * *